United States Patent
Tanaka et al.

(10) Patent No.: US 8,554,423 B2
(45) Date of Patent: Oct. 8, 2013

(54) AUTOMATIC TRANSMISSION DEVICE FOR WHEEL LOADER AND WHEEL LOADER

(75) Inventors: Tetsuji Tanaka, Abiko (JP); Masami Higaki, Ryugasaki (JP); Hirofumi Ouchi, Toride (JP); Eiichi Sakai, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 1266 days.

(21) Appl. No.: 11/916,177

(22) PCT Filed: Jun. 1, 2006

(86) PCT No.: PCT/JP2006/310978
§ 371 (c)(1),
(2), (4) Date: Nov. 30, 2007

(87) PCT Pub. No.: WO2006/129748
PCT Pub. Date: Dec. 7, 2006

(65) Prior Publication Data
US 2010/0017076 A1    Jan. 21, 2010

(30) Foreign Application Priority Data
Jun. 3, 2005  (JP) .................................. 2005-164123

(51) Int. Cl.
*F16H 61/00* (2006.01)

(52) U.S. Cl.
USPC ................. 701/50; 701/51; 701/65; 477/144; 477/148; 180/338

(58) Field of Classification Search
USPC ................. 701/50, 51, 65; 477/34, 115, 144, 477/148; 180/337, 338
See application file for complete search history.

(56) References Cited

U.S. PATENT DOCUMENTS

| | | | |
|---|---|---|---|
| 3,277,540 A | | 10/1966 | Buehrer |
| 4,574,661 A | * | 3/1986 | Opperud et al. ............. 477/126 |
| 4,608,873 A | * | 9/1986 | Redzinski ................... 74/336 R |
| 4,800,660 A | | 1/1989 | Masao |
| 5,026,335 A | * | 6/1991 | Oftedal et al. ............... 475/198 |
| 5,305,657 A | * | 4/1994 | Bray et al. .................. 74/336 R |

(Continued)

FOREIGN PATENT DOCUMENTS

| | | |
|---|---|---|
| CN | 1502495 A | 6/2004 |
| GB | 2 395 533 A | 5/2004 |

(Continued)

OTHER PUBLICATIONS

Zhang Guosheng et al., "Theory and Application Studies on Optimal Fuel Economy Shift Schedule", China Mechanical Construction, vol. 16, Issue 5, first half of Mar. 2005, Mar. 31, 2005, pp. 446-449.

(Continued)

*Primary Examiner* — Thomas Black
*Assistant Examiner* — Peter D Nolan
(74) *Attorney, Agent, or Firm* — Crowell & Moring LLP

(57) ABSTRACT

An automatic transmission device for a wheel loader includes: a shift mechanism; a work detection device that detects that the wheel loader is performing an excavation work; and a shift control device that executes control so as to downshift a speed stage at the shift mechanism if the work detection device detects that the wheel loader is performing the excavation work.

10 Claims, 4 Drawing Sheets

(56) References Cited

U.S. PATENT DOCUMENTS

| | | | |
|---|---|---|---|
| 5,319,559 A * | 6/1994 | Kusaka et al. | 701/110 |
| 5,746,680 A * | 5/1998 | Kato et al. | 477/95 |
| 5,769,206 A | 6/1998 | Miyazawa et al. | |
| 5,968,103 A * | 10/1999 | Rocke | 701/50 |
| 5,974,352 A * | 10/1999 | Shull | 701/50 |
| 6,199,450 B1 | 3/2001 | Carlson et al. | |
| 6,269,295 B1 * | 7/2001 | Gaugush et al. | 701/55 |
| 6,754,573 B2 * | 6/2004 | Russell et al. | 701/54 |
| 7,247,122 B2 * | 7/2007 | Shah | 477/68 |
| 2003/0233185 A1 * | 12/2003 | Takebayashi et al. | 701/55 |
| 2006/0063640 A1 * | 3/2006 | Doctrove | 477/34 |

FOREIGN PATENT DOCUMENTS

| | | |
|---|---|---|
| JP | 48-21368 B1 | 6/1973 |
| JP | 55-119837 A | 9/1980 |
| JP | 61-101326 A | 5/1986 |
| JP | 63-265730 A | 11/1988 |
| JP | 2-147732 A | 6/1990 |
| JP | 2-199356 A | 8/1990 |
| JP | 6-34029 A | 2/1994 |
| JP | 10-89467 A | 4/1998 |
| JP | 10141487 A * | 5/1998 |
| TW | 127680 | 1/1990 |
| TW | 450934 | 1/1990 |

OTHER PUBLICATIONS

Chinese Office Action dated Oct. 16, 2009 with partial English translation (eighteen (18) pages).

Hong Tao et al., "Software Design of the Automatic Transmission Control System of Loader", Chinese Journal of Construction Machinery, Jan. 2004, vol. 2, No. 1, China Academic Journal Electronic Publishing House. (Eighteen (18) pages).

Ding Chunfeng, "Study on automatic shift technology with Four-parameter of Construction Vehicle", 2004, Engineering Science and Technology II. (Thirty-four (34) pages).

"Study on the automatic shift control strategy of Hydraulic transmission", Journal of Beijing Technology and Business University (Natural Science Edition), Mar. 2005, vol. 23, No. 2, China Academic Journal Electronic Publishing House. (Eight (8) pages).

Taiwanese Office Action dated May 21, 2008 (Three (3) Pages).

International Search Report dated Aug. 22, 2006 (four (4) pages).

The Extended European Search Report dated Oct. 19, 2011 (Six (6) pages).

* cited by examiner

FIG.3

| | | AUTO SHIFT MODE | | |
|---|---|---|---|---|
| | | L | N | H |
| SHIFT POSITION | I | 1 | 1 | 1 |
| | II | 2 | 2 | 1, 2 |
| | III | 2, 3 | 2, 3 | 1, 2, 3 |
| | IV | 2, 3, 4 | 2, 3, 4 | 1, 2, 3, 4 |
| EQUIVALENT TO | | TRAVELING | HALFWAY | WORK |

AUTOMATIC TRANSMISSION DEVICE FOR WHEEL LOADER AND WHEEL LOADER

TECHNICAL FIELD

The present invention relates to an automatic transmission device for a wheel loader and a wheel loader.

BACKGROUND ART

While automatic transmissions for wheel loaders change gears in correspondence to vehicle speed, there is an automatic transmission known in the related art that maintains the current gear ratio (hereafter referred to as "speed stage") in correspondence to the position of a lift arm instead of automatically shifting the speed stage (see patent reference literature 1). This automatic transmission device holds the currently selected speed stage instead of downshifting if the lift arm assumes a position higher than the boom horizontal position.

patent reference literature 1: Japanese Laid Open Patent Publication No. S63-265730

DISCLOSURE OF THE INVENTION

Problems to be Solved by the Invention

There is a problem to be addressed in the automatic transmission device described above, which shifts down if the vehicle speed is lowered while the lift arm assumes a low position, in that depending upon the bucket position, an engine brake may be applied suddenly as it shifts down to speed 1 in the regular traveling state.

Means for Solving the Problems

An automatic transmission device for a wheel loader according to a first aspect of the present invention includes: a shift mechanism; a work detection device that detects that the wheel loader is performing an excavation work; and a shift control device that executes control so as to downshift a speed stage at the shift mechanism if the work detection device detects that the wheel loader is performing the excavation work.

It is preferable that the shift mechanism is connected to an engine via a torque converter; and the work detection device detects that the wheel loader is performing the excavation work based upon a speed ratio of the torque converter. A vehicle speed detector that detects a speed of the wheel loader may be further provided, and the shift control device may downshift the speed stage at the shift mechanism also based upon the speed of the wheel loader detected by the vehicle speed detector. A decelerating state detection device that detects a decelerating state in which the wheel loader decelerates may be further provided, and the shift control device may downshift the speed stage at the shift mechanism also based upon the decelerating state of the wheel loader detected by the decelerating state detection device. A pedal opening degree detector that detects an accelerator pedal opening degree may be further provided, and the shift control device downshifts the speed stage at the shift mechanism also based upon the accelerator pedal opening degree detected by the pedal opening degree detector.

It is preferable that the work detection device judges that the wheel loader is performing the excavation work when the speed ratio at the torque converter calculated by dividing an output rotational speed by an input rotational speed decreases to 0.6; and the shift control device shifts the speed stage at the shift mechanism down to speed 1 if the wheel loader is detected to be performing the excavation work.

A vehicle speed detector that detects a speed of the wheel loader; and a decelerating state detection device that detects a decelerating state in which the wheel loader decelerates may be further provided, the work detection device may judge that the wheel loader is performing the excavation work when the speed ratio at the torque converter calculated by dividing an output rotational speed by an input rotational speed decreases to 0.6; and the shift control device may shift the speed stage at the shift mechanism down to speed 1 if the speed ratio has decreased to 0.6, the wheel loader has decelerated continuously for 0.2 sec or longer and the speed of the wheel loader is at 4 kph or less. A pedal opening degree detector that detects an accelerator pedal opening degree may be further provided, and the shift control device may also require the accelerator pedal opening degree detected by the pedal opening degree detector to be 40% or more as a condition for shifting the speed stage at the shift mechanism down to speed 1.

It is preferable that the shift control device sustains the current speed stage at the shift mechanism for a period immediately after the traveling direction of the wheel loader is switched from forward to reverse or vice versa.

It is preferable that a work mode in which the wheel loader is performing a work or a non-work mode is to be selected for the wheel loader; and when the work mode is selected, an automatic downshift to speed 1 is enabled via the shift control device, whereas if the non-work mode is selected, a speed stage shift is executed via the shift control device over speed stages equal to speed 2 and higher. A first shift position with a range containing speed 1 and speed 2 and a second shift position with a range containing speed 1 and a plurality of speed stages equal to speed 2 and higher may be included in the work mode; and if the first shift position is selected in the work mode, the shift control device executes a speed stage shift between speed 1 and speed 2, whereas if the second shift position is selected in the work mode, the shift control device executes a speed stage shift among speed 1 and the plurality of speed stages equal to speed 2 and higher.

A wheel loader according to a second aspect of the present invention includes the automatic transmission device according to the first aspect.

In an automatic transmission method for a wheel loader according to a third aspect of the present invention, a speed stage at a shift mechanism is down shifted when the wheel loader is detected to be engaged in excavation work.

It is to be noted that a work detection device, a shift control device, and a decelerating state detection device may be replaced with a work detection means, a shift control means, and a decelerating state detection means, respectively.

Effect of the Invention

According to the present invention, a downshift is automatically executed when the wheel loader is engaged in excavation work and, as a result, the operability is improved.

BRIEF DESCRIPTION OF THE DRAWINGS

FIG. 3 shows the shift ranges set in correspondence to the various shift positions assumed in each auto shift mode.

BEST MODE FOR CARRYING OUT THE INVENTION

Figure 1:
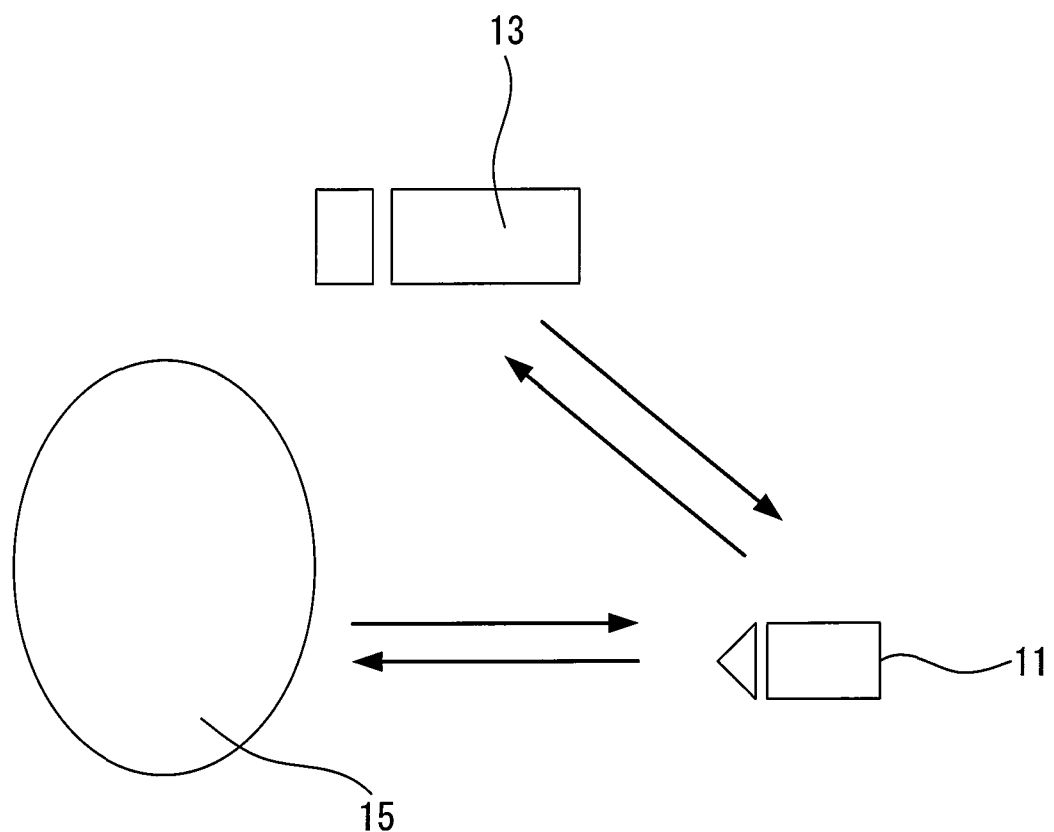
FIG. 1 illustrates the operation pattern of a wheel loader achieved in an embodiment of the present invention.

The following is a detailed explanation of an automatic transmission device for a wheel loader achieved in an embodiment of the present invention, given in reference to the drawings. FIG. 1 illustrates an operation pattern with which a wheel loader 11 equipped with the automatic transmission device achieved in the embodiment may be operated.

The main function of the wheel loader 11 is to dig into a mound 15 with a bucket attached thereto and load the excavated material or soil onto a dump truck 13. A typical operation pattern with which the wheel loader 11 excavates material is now explained in reference to FIG. 1. The wheel loader 11 advances toward the mound 15 with the speed stage set to speed 2 or higher. Upon arriving at the mound 15, the torque is raised by lowering the speed stage to speed 1 so that the bucket can be fully inserted into the mound 15. Once a sufficient load of material is taken into the bucket inserted at the mound 15, the wheel loader 11 travels reverse to a specific position with the speed stage set to speed 2 or higher. Subsequently, the wheel loader 11 changes direction so as to face toward the dump truck 13, advances to the dump truck 13 with the speed stage set to speed 2 or higher and loads the material in the bucket to the load-carrying platform of the dump truck 13.

As described above, the speed stage needs to be shifted frequently when the wheel loader 11 is engaged in work operation and an automatic transmission device is installed at the wheel loader 11 in order to reduce the onus placed on the operator. Generally speaking, speed stage shift or gear change in an automatic transmission device is controlled based upon the vehicle speed and thus, as the vehicle speed is lowered during excavation work, the speed stage is shifted down to speed 1, which is optimal for excavation work. However, if the downshift timing is determined entirely based upon the vehicle speed of the wheel loader 11, the downshift to speed 1 will occur as the vehicle speed becomes lower even in a regular traveling state while the wheel loader is, for instance, advancing toward the dump truck 13.

Accordingly, the automatic transmission device in the embodiment of the present invention is controlled so as to shift the speed stage with optimal timing, i.e., so as to execute a downshift to the speed stage suited for excavation work, when the wheel loader is engaged in excavation work by inserting the bucket at the mound 15.

Figure 2:
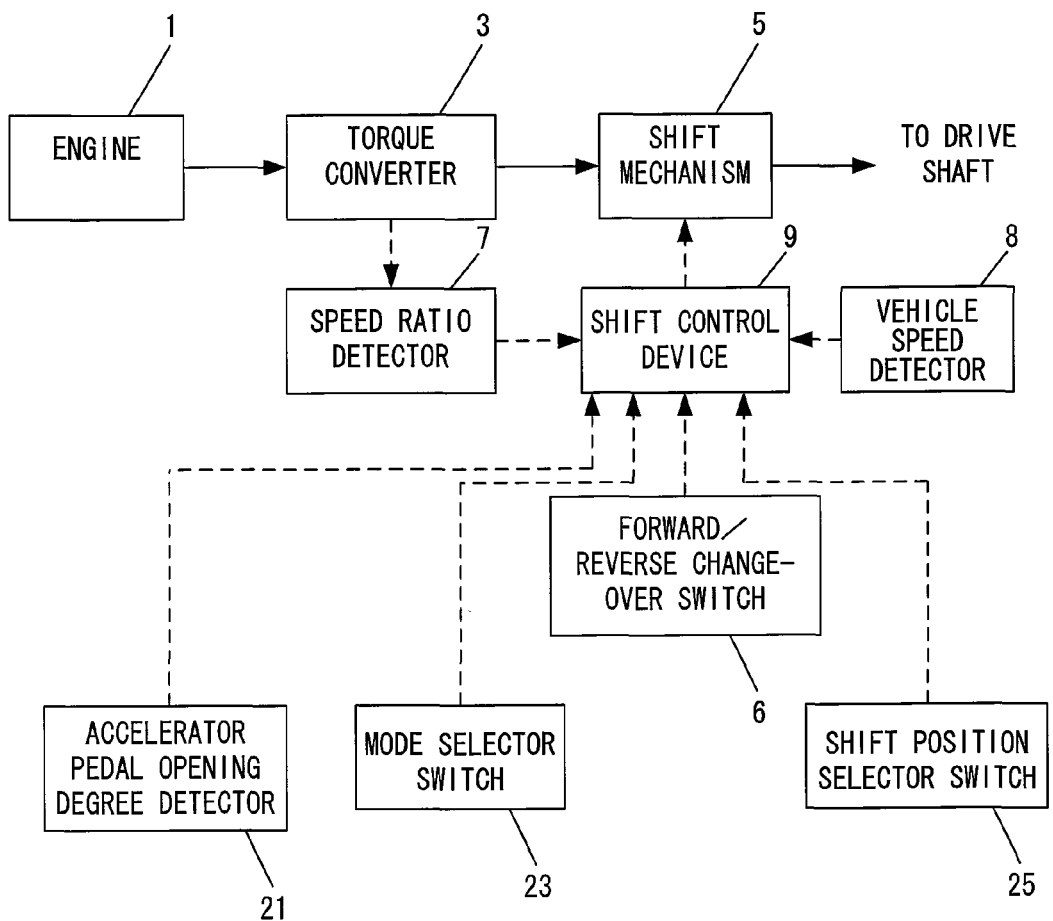
FIG. 2 is a control block diagram pertaining to a wheel loader equipped with an automatic transmission device achieved in an embodiment.

FIG. 2 is a control block diagram pertaining to the wheel loader 11 equipped with the automatic transmission device achieved in the embodiment. The wheel loader 11 includes an engine 1, a torque converter 3, a shift mechanism 5, a forward/reverse change-over switch 6, a speed ratio detector 7, a vehicle speed detector 8, a shift control device 9, an accelerator pedal opening degree detector 21, a mode selector switch 23 and a shift position selector switch 25.

A drive force delivered from the engine 1 causes rotation of a pump impeller (not shown) at the torque converter 3 and as the pump impeller rotates, a turbine runner (not shown) also rotates via hydraulic operating fluid. It is to be noted that the torque converter 3 also includes a stator (not shown) with which the input torque is boosted.

The rotational force from the torque converter 3 is transmitted to the shift mechanism 5. The shift mechanism 5 converts the rotational speed transmitted from the torque converter 3 to an optimal rotational speed at the drive shaft via an appropriate speed stage among a plurality of speed stages.

The speed ratio detector 7 detects the speed ratio achieved via the torque converter 3. The speed ratio achieved at the torque converter 3 may be expressed as; speed ratio=(output shaft rotational speed/input shaft rotational speed).

Signals from the speed ratio detector 7, which detects the speed ratio achieved at the torque converter 3, the vehicle speed detector 8, which detects the speed of the wheel loader 11, the forward/reverse change-over switch 6 operated to switch the wheel loader 11 from a forward traveling state to a reverse traveling state and vice versa, the accelerator pedal opening degree detector 21, the mode selector switch 23 and the shift position selector switch 25 are input to the shift control device 9. The accelerator pedal opening degree detector 21 detects the opening degree at the accelerator pedal operated by the operator (the extent to which the accelerator pedal has been operated). When the accelerator pedal has been operated to the full open state or fully depressed state, the opening degree is at 100%. The mode selector switch 23 is a selecting operation member operated by the operator to select an auto shift mode at the wheel loader 11 as detailed later, and may be, for instance, a dial type switch. The shift position selector switch 25 is an operation member operated by the operator to set an auto shift range when an auto shift mode is selected. The shift control device 9 adopts a structure that enables it to control the shift mechanism 5 so as to shift the speed stage based upon the information input from these sensors and switches.

As described earlier, a downshift should be executed with optimal timing since abrupt engine braking may occur if the shift mechanism 5 is shifted down to a lower speed stage at the wrong moment. Accordingly, the shift control device 9 controls the shift mechanism 5 to shift the speed stage down only if it is decided, based upon the signal provided from the forward/reverse change-over switch 6, that the traveling direction has not recently been switched from forward to reverse or vice versa, it is decided, based upon the signal provided from the vehicle speed detector 8, that the vehicle speed has been decreasing continuously and that the state of deceleration has been sustained over a predetermined length of time and it is decided, based upon the signal provided from the speed ratio detector 7, that the speed ratio at the torque converter 3 has decreased to a predetermined value.

Next, the operation of the automatic transmission device at the wheel loader 11 is explained in detail. A specific auto shift mode among a plurality of auto shift modes can be selected for the automatic transmission device by operating the mode selector switch 23. FIG. 3 shows automatic shift ranges set in correspondence to various speed stage shift positions assumed in each auto shift mode. The auto shift modes include; a traveling "L" mode, a traveling/work halfway "N" mode (for light work operation) and a work "H" mode. The traveling "L" mode and the light work "N" mode may each be regarded as a non-work mode.

In correspondence to each of the shift positions "I" through "IV", automatic shift ranges which contain at least a single speed stage among speed 1 through speed 4 are set. A specific shift position among the shift positions "I" to "IV" can be selected through an operation of the shift position selector switch 25.

If the work "H" mode among the three auto shift modes shown in FIG. 3 is selected and one of the shift positions "II" through "IV" is selected, the speed stage can be shifted down to speed 1 automatically. If, on the other hand, the traveling "L" mode or the light work "N" mode is selected, the speed stage cannot be shifted down to speed 1 automatically and thus, the shift position selector switch 25 needs to be operated to manually switch the shift position to "I" to shift down to speed 1. It is to be noted that in addition to the three auto shift modes, a manual mode in which the speed stage is manually switched may be selected at the automatic transmission device and in such a case, an auto shift mode or the manual mode may selected by operating the mode selector switch 23.

The operation of the automatic transmission device installed at the wheel loader 11 is first briefly described.

When the work "H" mode has been selected via the mode selector switch 23 and one of the shift positions "II" through "IV" has been selected at the shift position selector switch 25, the speed stage is shifted down to speed 1 at the shift mechanism 5 upon detecting that the wheel loader 11 is engaged in excavation work. The wheel loader 11 may be judged to be engaged in excavation work if, for instance, the vehicle has sustained a decelerating state continuously for 0.2 sec or longer, the speed ratio at the torque converter 3 has decreased to approximately 0.4~0.6 and the speed of the vehicle is equal to or less than 4 kph. If these conditions are satisfied, the shift control device 9 allows the speed stage at the shift mechanism 5 to be shifted down to speed 1. In addition, the shift control device 9 allows two seconds or more to elapse after the forward/reverse change-over switch 6 is operated and then executes the downshift when the conditions are satisfied. If the two-second period has not yet elapsed following the operation of the forward/reverse change-over switch 6, i.e., immediately after the traveling direction is switched from forward to reverse or vice versa, the shift control device sustains the current speed stage. In addition, as detailed later, the accelerator pedal opening degree detected by the accelerator pedal opening degree detector 21 may also be used as a condition based upon which a decision is made as to whether or not to downshift the speed stage.

(When the Work "H" Mode and the Shift Position "II" are Selected)

The following is the flow of the operation executed by the wheel loader 11 when the work "HH" mode is selected as the auto shift mode, i.e., when the wheel loader is engaged in excavation work. It is to be noted that the explanation is simplified by assuming that the shift position "II" in correspondence to which an auto shift range including two speed stages only, i.e., speed 1 and speed 2 is set, has been selected.

When the wheel loader 11 advances straight toward the mound 15 as shown in FIG. 1, the wheel loader must travel at a certain minimum speed and, accordingly, it advances forward with the speed stage set to speed 2. It is to be noted that the speed stage is normally set to speed 2 when the wheel loader 11 starts traveling.

Then, as the bucket held level at the wheel loader still traveling forward is inserted into the mound 15, the wheel loader 11 slows down due to the resistance of the bucket encountering the material. In addition, since the bucket is inserted in the mound 15, the output rotational speed does not increase at the wheel loader 11 even if the input rotational speed from the engine 1 is raised. As a result, the speed ratio at the torque converter 3 decreases.

At this time, if a period of two seconds or more has elapsed since the last operation of the forward/reverse change-over switch 6, the speed ratio at the torque converter 3 has decreased to 0.6 or less, the wheel loader has been in a decelerating state continuously over 0.2 sec or longer and the vehicle speed is at 4 kph or less, the shift control device 9 shifts the speed stage at the shift mechanism 5 from speed 2 down to speed 1. Once the speed stage is switched to speed 1, the torque increases so as to allow the wheel loader 11 to insert the bucket far enough into the mound 15.

Once a sufficient quantity of material from the mound 15 is collected into the bucket the wheel loader 11 starts backing off at speed 2. When the wheel loader has traveled reverse to a specific position, it changes its traveling direction in response to an operation of the forward/reverse change-over switch 6 and starts traveling forward toward the dump truck 13. At the time of forward/reverse switching, the speed ratio at the torque converter 3 assumes a smaller value, since brake is applied with a drive force imparted along the direction opposite from the traveling direction before the change-over, until the traveling direction of the wheel loader 11 is fully switched. However, since the two-second period has not yet elapsed after the operation of the forward/reverse change-over switch, the shift control device 9 does not shift the speed stage down to speed 1 and instead controls the shift mechanism 5 so as to sustain the current speed stage, i.e., speed 2.

The wheel loader 11 travels forward at speed 2 toward the dump truck 13, stops right beside the dump truck 13 and transfers the material from the bucket to the load-carrying platform of the dump truck 13. While the wheel loader 11 continuously decelerates for 0.2 sec or longer when it is coming to a stop, the input rotational speed and the output rotational speed both decrease at the torque converter 3 and thus, the speed ratio does not decrease to 0.6 or less. As a result, the shift control device 9 stops the wheel loader still maintaining speed 2 instead of shifting down the speed stage at the shift mechanism 5 to speed 1.

Once the material in the bucket is all transferred to the dump truck 13, the wheel loader 11 travels reverse at speed 2 to the initial position. The wheel loader 11 repeats this operation a number of times to load material from the mound 15 to the load-carrying platform of the dump truck 13.

Figure 4:
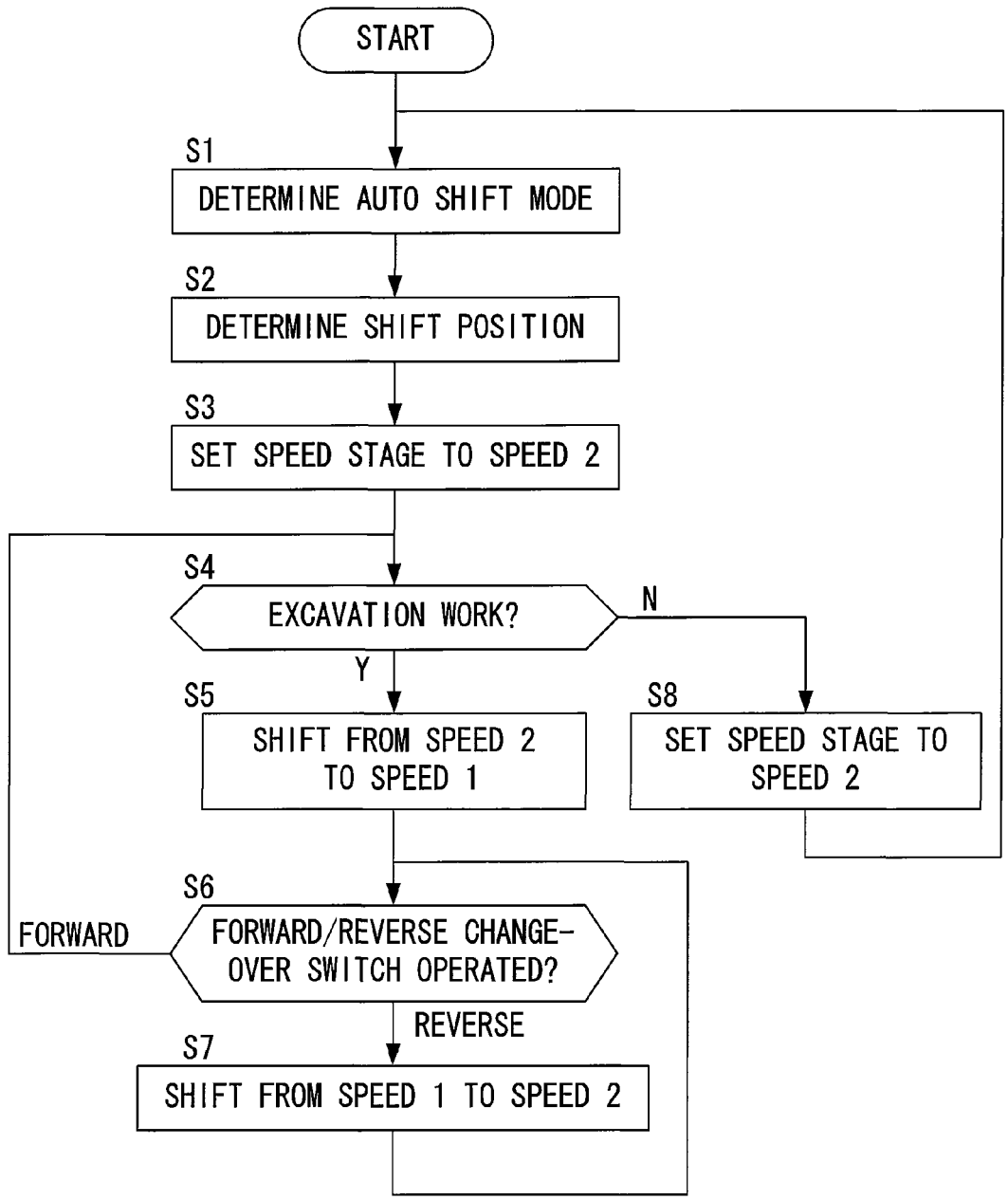
FIG. 4 presents a flowchart of the procedure of the control processing executed in the automatic transmission device in the embodiment.

The operation of the automatic transmission device executed when the wheel loader 11 is engaged in the excavation work as described above is now explained in reference to the flowchart presented in FIG. 4. FIG. 4 presents a flowchart of the procedure of the shift control processing executed in the automatic transmission device. The explanation is given by assuming that the work "H" mode has been selected for the auto shift mode and that the shift position "II" has been selected.

In step S1, the signal from the mode selector switch 23 is read and, based upon the signal thus read, the auto shift mode is judged to be the work "H" mode. In step S2, the signal from the shift position selector switch 25 is read and based upon the signal thus read, the shift position is judged to be "II". In step S3, the speed stage at the shift mechanism 5 is set to speed 2. With the speed stage set to speed 2, the wheel loader 11 advances straight to the mound 15.

In step S4, a decision is made as to whether or not the wheel loader 11 is about to engage in excavation work. If two seconds or more has elapsed since the last operation of the forward/reverse change-over switch 6, the speed ratio at the torque converter 3 has decreased to 0.6 or less, the wheel loader has been decelerating continuously for 0.2 sec or longer and the current vehicle speed is 4 kph or less, the wheel loader 11 is judged to be engaged in excavation work and the operation proceeds to step S5. In step S5, the shift control device 5 shifts the speed stage at the shift mechanism 5 from speed 2 down to speed 1. Once the speed stage is switched to speed 1, the torque increases so as to allow the wheel loader 11 to insert the bucket far enough into the mound 15.

In step S6, a decision is made as to whether or not the forward/reverse change-over switch 6 has been operated. If the forward/reverse change-over switch 6 is judged to have been operated to the reverse setting, the operation proceeds to step S7 to upshift the speed stage at the shift mechanism 5 to speed 2. As a result, the wheel loader 11, having collected material into the bucket, travels reverse at speed 2. After the speed stage is shifted up to speed 2 in step S7, the operation returns to step S6 to make a decision with regard to the direction selected by operating the forward/reverse change-over switch 6 again. If the forward/reverse change-over switch 6 is still set at the reverse traveling position, the speed stage at the shift mechanism 5 is sustained at speed 2. When the wheel loader 11 has traveled reverse to a specific position and the forward/reverse change-over switch 6 is operated to select forward traveling so as to allow the wheel loader to travel forward toward the dump truck 13, the operation returns from step S6 to step S4.

In step S4, a decision is made again as to whether or not the wheel loader 11 is to engage in excavation work. At the time of forward/reverse switching, the speed ratio at the torque converter 3 assumes a smaller value, since brake is applied with a drive force imparted along the direction opposite from the pre-change-over traveling direction until the traveling direction of the wheel loader 11 is fully switched. However, since the two-second period has not yet elapsed since the operation of the forward/reverse change-over switch 6, the wheel loader is not judged to be about to engage in excavation work and, accordingly, a negative decision is made in step S4. When the wheel loader is not about to engage in excavation work, i.e., when the wheel loader is in the regular traveling state, the operation proceeds to step S8 in which the shift control device 9 controls the shift mechanism 5 so as to sustain the current speed state, i.e., speed 2. Once the processing in step S8 is completed, the operation returns to step S1.

As described above, the automatic transmission device achieved in the embodiment is able to automatically shift the speed stage down to the stage optimal for excavation work, i.e., to speed 1, only when the wheel loader 11 is engaged in excavation work, without shifting the speed stage down to speed 1 if the wheel loader 11 is in the regular traveling state.

It is to be noted that the following operational advantages can be achieved by controlling the shift timing so as to shift the speed stage down to speed 1 when the speed ratio at the torque converter 3 has decreased to 0.6. For instance, if control is executed so as to shift the speed stage down to speed 1 while the speed ratio is 0.7 or more, the downshift to speed 1 occurs prematurely before the bucket is inserted far enough into the mound 15. In this situation, the input torque of the engine 1 will be wasted and ultimately, fuel will be wasted. If, on the other hand, a value smaller than 0.6 is set as a speed ratio threshold value in reference to which the decision as to whether or not the downshift to speed 1 is to be executed, the downshift will occur too late and, as a result, the inertial force of the vehicle motion cannot be utilized in the excavation work.

In addition, by executing control so as to ensure that the downshift to speed 1 does not occur unless the wheel loader decelerates continuously for 0.2 sec or longer, it is ensured that an undesirable downshift to speed 1 does not occur even if the input rotation rate increases relative to the output rotation rate at the torque converter 3 at, for instance, a vehicle start to result in a decrease in the speed ratio, since the decelerating state is not sustained over the predetermined length of time or longer.

EXAMPLES OF VARIATIONS

While the automatic transmission device achieved in an embodiment of the present invention has been described, the present invention is not limited to this example and allows for numerous variations without departing from the scope thereof. For instance, shift patterns other than those shown in FIG. 3 may be set in correspondence to the various shift positions in each auto shift mode.

Conditions other than those described above may be set as the conditions under which the downshift to speed 1 is allowed. As long as the speed ratio at the torque converter 3 has decreased and the wheel loader 11 is detected to be about to engage in excavation work, the downshift to the speed stage optimal for work operation may be allowed. In addition to the conditions explained above, the accelerator pedal opening degree detected via the accelerator pedal opening degree detector 21 may be used as a downshift condition. Generally speaking, the accelerator pedal is depressed to a great extent when the wheel loader is engaged in excavation work. Accordingly, if the accelerator pedal opening degree is less than 40%, i.e., if the extent to which the accelerator pedal is depressed is small, a downshift to speed 1 should not be allowed. In particular, by disallowing a downshift to speed 1 unless the accelerator pedal opening degree is 80~100%, it is ensured that an undesirable downshift does not occur while the wheel loader 11 is leveling the ground in a decelerating state with the bucket before it starts the actual excavation work.

In the embodiment described above, an automatic downshift to speed 1 is allowed if the work "H" mode has been selected as the auto shift mode. However, it is desirable to allow the automatic downshift to speed 1 whenever the speed 1 drive force is required for operations other than excavation work as well. For instance, the automatic downshift to speed 1 should be allowed when the wheel loader 11 is traveling uphill. Accordingly, control should be executed so as to shift the speed stage down to speed 1 when the wheel loader 11 traveling uphill at speed 2 has decelerated continuously for 0.2 sec or longer, the vehicle speed has slowed to 4 kph or less and the accelerator pedal opening degree is 40% or more. In this case, a downshift can be executed with optimal timing when the wheel loader is traveling on a steep uphill slope, requiring significant drive force.

In addition, in reference to the embodiment, an explanation is given above on the shift control processing executed when the work "H" mode has been set for the auto shift mode and the shift position "II" with the automatic shift range containing speed 1 and speed 2 has been selected. While speed 1 is selected for the work speed stage in the work "H" mode, speed 2 is to be selected as the work speed stage in the light work "N" mode. Accordingly, when the light work "N" mode has been selected in conjunction with any shift position among the shift positions "II" through "IV", the shift control device 9 may allow the wheel loader to engage in excavation work with the speed stage shifted down to speed 2 upon detecting via the speed ratio detector 7 that the speed ratio at the torque converter 3 has decreased to a specific value due to the high load of the excavation work.

(Shift Control Processing Executed when the Work "H" Mode and the Shift Position "IV" are Selected)

The operation of the automatic transmission device executed when the work "H" mode is selected for the auto shift mode in conjunction with the shift position "IV". It is to be noted that the shift control device 9 controls the speed stage shift to a speed stage equal to or higher than speed 2 based upon the speed of the wheel loader 11.

The wheel loader 11 first starts traveling at speed 2. As the wheel loader 11 gradually gathers speed, the speed of the wheel loader 11 detected via the vehicle speed detector 8 is provided as vehicle speed information to the shift control device 9. Based upon the speed of the wheel loader 11 having been detected, the shift control device 9 shifts the speed stage at the shift mechanism 5 from speed 2 up to speed 3 and then to speed 4. As the wheel loader 11 moves closer to the mound 15 (see FIG. 1), the vehicle slows down in response to a braking operation by the operator. The vehicle speed detector 8 provides the shift control device 9 with the vehicle speed information indicating the speed of the wheel loader 11 it has detected and, based upon the detected vehicle speed, the shift control device 9 shifts the speed stage at the shift mechanism 5 from speed 4 to speed 3 and then to speed 2. It is to be noted that when shifting the speed stage down in correspondence to a decrease in the vehicle speed, i.e., in the regular traveling state, the speed ratio at the torque converter 3 does not assume a value smaller than the decision-making threshold value (e.g., 0.6) in reference to which a decision is made as to whether or not to shift down to speed 1 and, as a result, the speed stage is downshifted only to speed 2.

As the bucket held in a level attitude at the wheel loader 11 still traveling forward is inserted at the mound 15, the speed ratio at the torque converter 3 decreases and the wheel loader is thus detected to be engaged in excavation work. At this time, since the conditions with regard to the vehicle speed, the decelerating state and the like are satisfied, the shift control device 9 shifts the speed stage at the shift mechanism 5 down to speed 1. As a result, the drive force necessary for the excavation work becomes available to the wheel loader 11 and the bucket can be inserted far enough into the mound 15.

Once a sufficient quantity of material from the mound 15 is collected in the bucket the wheel loader 11 starts traveling reverse at speed 2. As the speed of the wheel loader 11 increases, the shift control device 9 shifts the speed stage at the shift mechanism 5 from speed 2 up to speed 3 and then to speed 4. The shift control device 9 thus shifts the speed stage at the shift mechanism 5 in correspondence to the vehicle speed while the wheel loader 11 transfers the material in the bucket to the load-carrying platform of the dump truck 13 and then returns to the initial position. The wheel loader 11 repeats this operation a number of times.

It is to be noted that the explanation is given above on an example in which the wheel loader 11 is slowed down as the wheel loader moves closer to the mound 15 and the operator applies the brakes and the bucket is subsequently inserted at the mound 15 after the speed stage is shifted down to speed 2 in correspondence to the vehicle speed. When the bucket is inserted at the mound 15 after the speed stage is downshifted to speed 3 in correspondence to the vehicle speed, too, the speed of the wheel loader 11 decreases as the bucket is inserted at the mound, accordingly, the shift control device 9 automatically downshifts the speed stage at the shift mechanism 5 to speed 2. It then shifts the speed stage down to speed 1 if the conditions explained earlier are satisfied.

It is to be noted that while the auto shift modes include the traveling "L" mode, the light work "N" mode and the work "H" mode in the embodiment described above, the present invention is not limited to this example and it may be adopted in a wheel loader that assumes the work "H" mode only or a wheel loader that assumes auto shift modes which includes the work "H" mode and either the traveling "L" mode or the light work "N" mode. In addition, while any of the shift positions "I"~"IV" may be selected in the work "H" mode, the present invention is not limited to this example and it may be adopted in a wheel loader that assumes the shift position "II" with an automatic shift range containing speed 1 and speed 2 alone, or a wheel loader that assumes the shift position "II" with the automatic shift range containing speed 1 and speed 2 and either the shift position "III" or the shift position "IV" with an automatic shift range containing a plurality of speed stages including speed 1, speed 2 and higher.

Also, a decision is made based upon the speed ratio at the torque converter 3 as to whether or not the wheel loader 11 is currently engaged in excavation work in the embodiment described above. This structure allows the decision as to whether or not to downshift to the work speed stage to be made by utilizing an existing sensor. However, the present invention is not limited to this example and may be adopted in a structure that includes a special sensor for detecting whether or not the wheel loader 11 is currently engaged in excavation work. Alternatively, the present invention may be adopted in a structure that detects slippage at the torque converter 3 through a method other than the speed ratio-based method.

While the invention has been particularly shown and described with respect to a preferred embodiment and variations thereof by referring to the attached drawings, the present invention is not limited to these examples and it will be understood by those skilled in the art that various changes in form and detail may be made therein without departing from the scope and teaching of the invention.

The disclosure of the following priority application is herein incorporated by reference: Japanese Patent Application No. 2005-164123 filed Jun. 3, 2005

The invention claimed is:

1. An automatic transmission device for a wheel loader, comprising:
   a shift mechanism connected to an engine via a torque converter;
   a vehicle speed detector that detects a speed of the wheel loader;
   a forward/reverse changeover switch that is operated to switch a traveling direction of the wheel loader from forward to reverse or vice versa;
   a decelerating state detection device that detects a decelerating state in which the wheel loader decelerates;
   a work detection device that detects that the wheel loader is performing an excavation work when a first predetermined period of time or more has elapsed since an operation of the forward/reverse changeover switch, a speed ratio at the torque converter calculated by dividing an output rotational speed by an input rotational speed decreases to a predetermined value or less, the deceleration state of the wheel loader continues over a second predetermined period of time, and the vehicle speed detector detects that the speed of the wheel loader is equal to or less than a predetermined speed;
   a shift control device that executes control so as to downshift a speed stage at the shift mechanism to speed 1 if the work detection device detects that the wheel loader is performing the excavation work.

2. The automatic transmission device for a wheel loader according to claim 1, further comprising:
   a pedal opening degree detector that detects an accelerator pedal opening degree, wherein:
   the shift control device downshifts the speed stage at the shift mechanism to speed 1 also based upon the accelerator pedal opening degree detected by the pedal opening degree detector.

3. The automatic transmission device for a wheel loader according to claim 1, wherein:
   the work detection device judges that the wheel loader is performing the excavation work when the speed ratio at the torque converter calculated by dividing an output rotational speed by an input rotational speed decreases to 0.6.

4. The automatic transmission device for a wheel loader according to claim 1, wherein:
the work detection device judges that the wheel loader is performing the excavation work when the speed ratio has decreased to 0.6, the wheel loader has decelerated continuously for 0.2 sec or longer and the speed of the wheel loader is at 4 kph or less.

5. The automatic transmission device for a wheel loader according to claim 4, further comprising:
a pedal opening degree detector that detects an accelerator pedal opening degree, wherein:
the shift control device also requires the accelerator pedal opening degree detected by the pedal opening degree detector to be 40% or more as a condition for shifting the speed stage at the shift mechanism down to speed 1.

6. The automatic transmission device for a wheel loader according to claim 1, wherein:
the shift control device sustains the current speed stage at the shift mechanism for a period immediately after the traveling direction of the wheel loader is switched from forward to reverse or vice versa.

7. The automatic transmission device for a wheel loader according to claim 1, wherein:
a work mode in which the wheel loader is performing a work or a non-work mode is to be selected for the wheel loader; and
when the work mode is selected, an automatic downshift to speed 1 is enabled via the shift control device, whereas if the non-work mode is selected, a speed stage shift is executed via the shift control device over speed stages equal to speed 2 and higher.

8. The automatic transmission device for a wheel loader according to claim 7, wherein:
a first shift position with a range containing speed 1 and speed 2 and a second shift position with a range containing speed 1 and a plurality of speed stages equal to speed 2 and higher are included in the work mode; and
if the first shift position is selected in the work mode, the shift control device executes a speed stage shift between speed 1 and speed 2, whereas if the second shift position is selected in the work mode, the shift control device executes a speed stage shift among speed 1 and the plurality of speed stages equal to speed 2 and higher.

9. A wheel loader comprising:
an automatic transmission device according to claim 1.

10. An automatic transmission method for a wheel loader in which a shift mechanism of the wheel loader is connected to an engine of the wheel loader via a torque converter, comprising:
detecting a speed of the wheel loader with a vehicle speed detector;
detecting a decelerating state in which the wheel loader decelerates;
detecting that the wheel loader is performing excavation work when a first predetermined period of time or more has elapsed since an operation of a forward/reverse changeover switch that is operated to switch a traveling direction of the wheel loader from forward to reverse or vice versa, a speed ratio at the torque converter calculated by dividing an output rotational speed by an input rotational speed decreases to a predetermined value or less, the deceleration state of the wheel loader continues over a second predetermined period of time, and the vehicle speed detector detects that the speed of the wheel loader is equal to or less than a predetermined speed; and
downshifting a speed stage at the shift mechanism to speed 1 as the wheel loader is detected to be performing the excavation work.

* * * * *